Aug. 19, 1924.
W. R. UHLEMANN
1,505,447
PUPILLARY MEASURING INSTRUMENT
Original Filed May 9, 1922
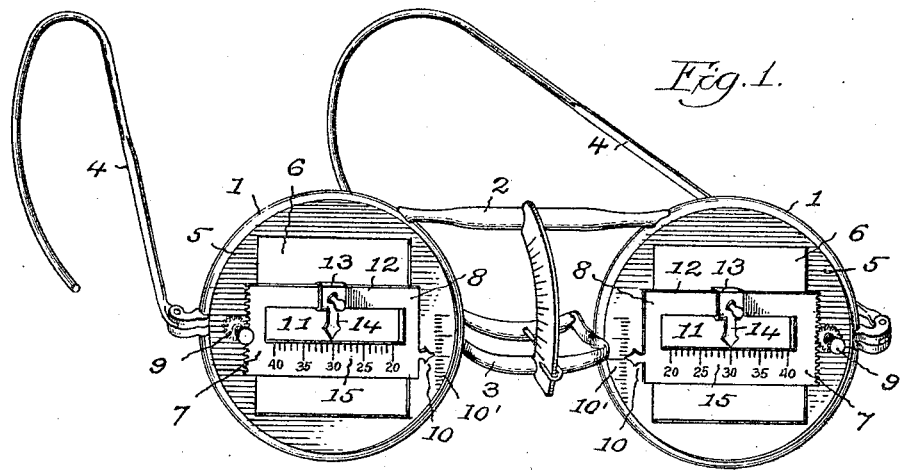
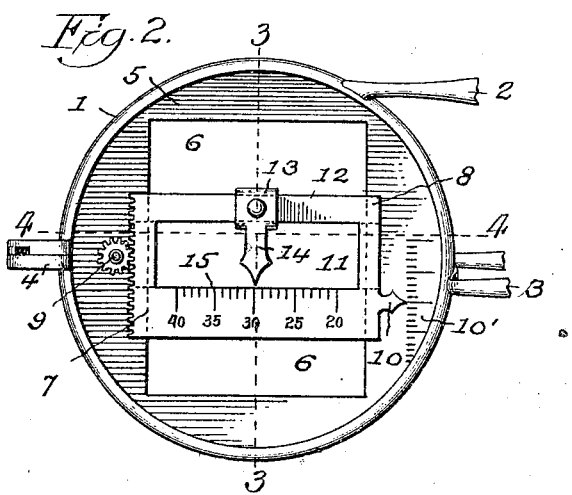
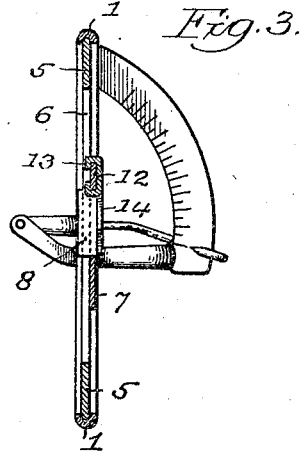
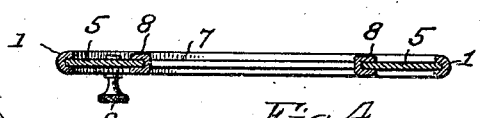
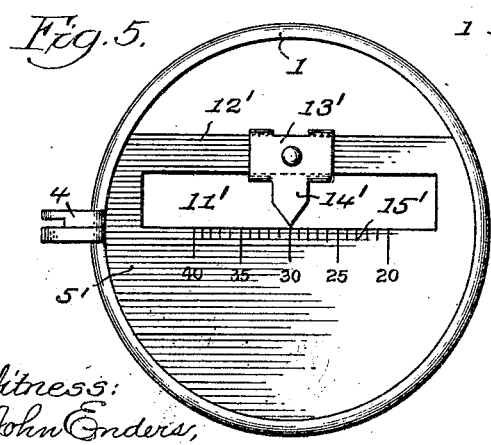
Witness:
John Enders,
Inventor:
William R. Uhlemann
by Robert Burns,
Atty.

Patented Aug. 19, 1924.

1,505,447

UNITED STATES PATENT OFFICE.

WILLIAM R. UHLEMANN, OF CHICAGO, ILLINOIS, ASSIGNOR TO UHLEMANN OPTICAL COMPANY, OF CHICAGO, ILLINOIS, A CORPORATION OF ILLINOIS.

PUPILLARY-MEASURING INSTRUMENT.

Application filed May 9, 1922, Serial No. 559,627. Renewed January 21, 1924.

*To all whom it may concern:*

Be it known that I, WILLIAM R. UHLEMANN, a citizen of the United States of America, and a resident of Chicago, in the county of Cook and State of Illinois, have invented a certain new and useful Improvement in Pupillary-Measuring Instruments, of which the following is a specification.

This invention relates to instruments for use by opticians in ascertaining the position of the bridge of the nose of a person being tested with relation to the pupils of the eyes, with a view to an accurate fitting of eyeglasses for such person. And the present improvement has for its object:—

To provide a structural formation and combination of parts and elements of a gage frame, whereby the distance from the center or median line of the person's nose, of the respective pupillary centers of the eyes is ascertained and indicated in a ready, convenient and accurate manner, in a horizontal direction, or in both a horizontal and vertical direction, all as will hereinafter more fully appear.

In the accompanying drawing:—

Fig. 1, is a perspective view of a gage frame embodying the preferred form of the invention.

Fig. 2, is an enlarged detail front elevation of a side portion of the gage frame.

Fig. 3, is a detail transverse section on line 3—3, Fig. 2.

Fig. 4, is a detail horizontal section on line 4—4, Fig. 2.

Fig. 5, is an enlarged detail front elevation of a side portion of a modified or primary form of the invention.

Like reference numerals indicate like parts in the several views.

As represented in the drawing, the main frame of the instrument is preferably of a spectacle frame form and comprising a pair of circular frames or rings 1 connected together in spaced relation by an upper tie bar 2 and a lower tie bar 3 of a curved form. The bars 2 and 3 will ordinarily support means by which the proper angle at which the plane of the resting surface of the nose bridge of an eyeglass frame is to be set with relation to the plane of the lenses, is accurately gaged and determined as set forth in my prior application for Letters Patent Serial No. 541,273, filed March 6, 1922, and which as illustrated in Fig. 1, is capable of convenient use in connection with the present improvement.

4 designate ordinary temple bars attached to the outer ends of the frame rings 1 for engagement around the ears of the person being measured to hold the instrument in position.

5 designates a pair of counterpart skeleton plates or webs fitted in the frame rings 1 and adapted to support the adjustable portions of the invention, and with the skeleton formation preferably attained in both types of the invention by a central rectangular opening 6 in each plate or web 5, as shown.

In the preferred type of the invention shown in Figs. 1 to 4 inclusive, each opening 6 is of an approximately square shape with the vertical side edges of each opening forming a slideway for a vertically adjustable gage frame now to be described.

7 designates a vertically adjustable gage frame individual to an opening 6 and having on its respective ends guide flanges or lips 8 adapted for sliding engagement with the vertical edges of an opening 6 aforesaid.

The adjustment of each frame 7 of the structure may be effected by hand, it is preferable however to use the ordinary rack and pinion adjusting means 9 to effect such function.

10 designates an index finger or pointer on each frame 7, having association with a graduated scale 10' on a plate or web 5 to indicate the vertical adjustment of a frame 7 in attaining an accurate measurement of the relative height of a pupillary center of the eye above the resting plane of the appliance upon the nose of the person being tested.

11 designates a centrally arranged elongated opening formed in each frame 7, preferably of a rectangular shape as shown, with its straight lower edge adapted to act as a gage line for the operator in effecting the proper vertical adjustment of the frame 7, in relation to the pupillary center of the eye of a person being examined.

12 designates a bar forming the upper border portion of the opening 11 aforesaid, and constituting a slideway for a slide 13 carrying an index finger or pointer 14 associated with a graduated scale 15 on the frame 7 to indicate the horizontal adjustment of the finger or pointer 14 in the operation of obtaining an accurate measurement of the distance between the median line of the nose and the pupillary center of the eye of a person being examined.

In the primary form of the invention illustrated in Fig. 5, and which is intended for use in ascertaining the distance between the median line of the nose and the pupillary centers of the eyes, the arrangement of parts above described in connection with the preferred type of the invention will be modified as follows:—

5' designate one of a pair of counterpart plates or webs fitted and fixedly held in the frame rings 1 and formed with horizontally elongated openings 11', with the straight lower edge of each opening adapted to act as a gage or light line for the operator in an adjustment of the index finger or pointer hereinafter described.

12' designates a horizontal bar or rail forming the upper border or margin of each opening 11', and constituting a slideway for a slide 13' carrying an index finger or pointer 14' associated with a graduated scale 15' along the lower border of the opening 11'. The parts being similar in function and operation to the parts 11, 12, 13, 14 and 15 heretofore described.

In the construction just described, the space between the upper edge of the bar or rail 12' and the frame ring 1 is left open for the passage of light to the parts being measured and with a view to assist the operation in attaining accurate adjustments of the parts.

Having thus fully described my invention what I claim as new and desire to secure by Letters Patent is:—

1. In an optician's instrument for measuring pupillary distances, the combination of a pair of holding rings, an intermediate rail fixedly connecting said rings together and carrying a nose bridge or rest, temple bars secured to the outer sides of said rings, an orificed plate associated with each of said rings, and a movable index finger and graduated scale associated with each orificed plate.

2. In an optician's instrument for measuring pupillary distances, the combination of a pair of holding rings, an intermediate rail fixedly connecting said rings together and carrying a nose bridge or rest, temple bars secured to the outer sides of said rings, an orificed plate associated with each of said rings, orificed frames having vertical adjustment on said plates, a horizontally adjustable index finger and a graduated scale associated with each of said orificed frames, and a vertically adjustable index finger and graduated scale associated with each of said adjustable orificed frames and orificed plates Signed at Chicago, Illinois, this 6th day of May 1922.

WILLIAM R. UHLEMANN.